United States Patent [19]

Ruben

[11] 4,131,515
[45] Dec. 26, 1978

[54] METHOD FOR MAKING POSITIVE ELECTRODE FOR LEAD-SULFURIC ACID STORAGE BATTERY

[76] Inventor: Samuel Ruben, 52 Seacord Rd., New Rochelle, N.Y. 10804

[21] Appl. No.: 828,882

[22] Filed: Aug. 26, 1977

[51] Int. Cl.$^2$ ............................................. H01M 10/44
[52] U.S. Cl. ....................................................... 204/2.1
[58] Field of Search ........................................... 204/2.1

[56] References Cited

U.S. PATENT DOCUMENTS 3,929,505  12/1975  Burkett et al. ......................... 204/2.1

Primary Examiner—Charles F. LeFevour

[57] ABSTRACT

Oxides of lead supported on a storage battery metal grid are cathodically reduced to lead in situ and are thereafter anodically converted to a pure form of lead peroxide of high electrical conductivity to serve as the cathodic reactant for lead-sulfuric acid storage batteries.

7 Claims, No Drawings

METHOD FOR MAKING POSITIVE ELECTRODE FOR LEAD-SULFURIC ACID STORAGE BATTERY

This invention relates to an improvement in rechargeable lead acid batteries and particularly to the production of a more efficient cathode or positive electrode.

An object of the invention is to produce an improved and more efficient lead-sulfuric acid storage battery.

A specific object is to provide an improved cathodic reactant of high electrical conductivity for such batteries.

A further object is the provision of a lead peroxide cathodic reactant having low inter-granular contact resistance between the peroxide crystals.

Other objects will be apparent as the disclosure proceeds.

In my various patents and pending applications relating to lead-sulfuric acid storage batteries, I describe the use of lead plated expanded grids of such metals as titanium, stainless steel and copper as the support for the lead peroxide cathodic reactant. As described in those patents and applications, the lead peroxide is electroformed or produced by the oxidation of a lower lead oxide to lead peroxide or by intermediate steps from lead sulfate. Similar processes are used in producing lead peroxide cathodic reactants in conventional lead-acid storage batteries.

The present invention consists in producing a new and more efficient lead peroxide cathodic reactant of high electrical conductivity by in situ cathodically reducing to lead the lower oxides of lead such as are customarily converted to lead peroxide for use as the cathodic reactant, and thereafter in situ anodically converting the lead to lead peroxide.

In carrying out the invention, the open spaces of a grid of lead coated copper screen or a grid of expanded copper or nickel plated stainless steel, which has been plated with a tin-nickel alloy and thereafter lead plated, are filled with a paste of oxides such as PbO, $Pb_2O_3$ or $Pb_3O_4$, herein defined as "lower oxides." Instead of converting these to the higher oxide of $PbO_2$ as the cathode or positive electrode, as in common practice, I cathodically reduce and convert these lower oxides to a homogeneous lead coating. After the entire mass held in the grid spacings has been completely converted to lead, the polarity of the electrode being electrolyzed is reversed from a cathodic or reducing polarity to an anodic or oxidizing polarity. This produces a purer form of lead peroxide, substantially free of lead sulfate content, and having a higher electrical conductivity, due to lower intergranular contact resistance between the lead peroxide crystals.

The superiority is manifest in improved mechanical form and retention of the lead peroxide formed in the retainer spaces and the higher electrochemical conversion cyclic efficiency on discharge and charge. The available flash or short circuit currents of batteries made with the cathodic reactant are considerably higher under equivalent conditions than batteries using cathodic reactants made by oxidation of a lower lead oxide to lead peroxide or by electrolytic conversion of lead sulfate to lead peroxide.

The cathode of this invention is advantageously used in storage batteries of the encapsulated type disclosed in my U.S. Pat. No. 3,870,563 entitled "Hermetically Sealed Storage Battery" and my co-pending U.S. Pat. applications, S.N. 801,912, "Low Internal Resistance Lead Acid Storage Battery". The following describes the process, according to this invention, for making a cathode or positive electrode for a typical battery of that type:

A grid 3-7/16" × 4-5/16" formed from 6 × 16 mesh lead coated copper screen is electroplated with a 65% Tin 35% Nickel Alloy, a current of 1.5 amperes being applied at 65° C for 15 minutes. The electrolyte for depositing a non-porous tin-nickel alloy coating is composed of:

| | |
|---|---|
| $SnCl_2$ | 48.7 g/l |
| $NiCl_2.6H_2O$ | 300 g/l |
| $NH_4HF_2$ | 50.2 g/l |
| $NH_4OH$ to pH of 2.3 | |

After application of the tin-nickel alloy plate, the grid is lead plated for 1.5 hours at room temperature in a solution of 1 part by volume of a 50% lead fluoborate solution, 3 parts by volume of water and 2.0 g per liter of Peptone brightener. This produces a well bonded lead coating of approximately 24 grams of lead on the tin nickel surface, resistant to mechanical and thermal stress.

The positive electrode lead plated metal grid is then coated with a lead oxide paste, (70 grams when dry) made by mixing together and grinding 72 grams of N.L. Industries #25B (25% $Pb_3O_4$/75% PbO) and 8.0 cc 6% by volume of $H_3PO_4$ (7.1 cc. 85% $H_3PO_4$/92.9cc $H_2O$). 6.4 ml of 1.400 s.g. $H_2SO_4$ is slowly added to the mix, as well as 7 to 8 ml of $H_2O$ to make the mix more spreadable. The coated positive grids are placed in an airtight humidifying container to avoid premature drying of the coating and are stacked with separating strips of polyethylene and kept in an oven for 5 days. They are then dried in a 60° C oven for 12 hours so that they contain less than 5% residual moisture after drying.

Instead of anodically converting the paste of $Pb_3O_4$ and PbO to $PbO_2$ on the positive electrode as is customary in the prior art and present practice, I cathodically reduce these lower oxides in situ to lead in a solution of 1.05 sp g $H_2SO_4$ containing 1% $H_3PO_4$. Thereafter the grid is anodically connected in the $H_2SO_4$, $H_3PO_4$ solution and current discharged through the grid until the spongy lead which has been reduced from the oxide paste and which fills the spaces in the screen grid, is converted to lead peroxide by direct electrolytic oxidation of the lead. The lead peroxide thus produced is markedly different in structure from the mixtures of lead oxide and lead sulfate ordinarily used in the positive grid and is characterized by higher electrical conductivity and low inter-granular contact resistance. The phosphoric acid in the processing electrolyte assists in minimizing residual inactive lead sulfate content.

The positive electrode as described above is assembled with a negative electrode such as a lead coated copper grid having a tin-nickel alloy plating and a layer of lead thereover and an electrolyte of immobilized sulfuric acid and encapsulated with an epoxy resin in the manner illustrated in my patents and patent applications hereinabove mentioned.

Where an expanded copper grid is used, the tin-nickel alloy is directly plated on the grid. Where a stainless steel grid is used, a flash coating of nickel is applied to the grid, prior to application of the tin-nickel alloy plate.

The electrode may also be used in unencapsulated batteries and other structures employing liquid electrodes. It is useful in primary as well as in secondary cell. I claim:

1. The process of producing a positive electrode for lead-sulfuric acid electric current producing cells which comprises coating a metal grid having a lead surface with lower oxides of lead selected from the group consisting of Pbo, $Pb_2O_3$ and $Pb_3O_4$ cathodically reducing said oxides to lead in situ and thereafter anodically converting said lead in situ to lead peroxide.

2. The process described in claim 1 characterized in that successive electro-plates of tin nickel alloy and lead are applied to said grid prior to coating with the lower oxides of lead.

3. The process described in claim 1 characterized in that the metal grid is composed of one of the metals copper and stainless steel.

4. A process for producing a positive electrode for lead sulfuric acid storage batteries, which comprises plating a tin-nickel alloy on a foraminous copper grid, plating a layer of lead on said tin-nickel alloy plate, filling the open spaces of and coating the plated grid with oxides of lead selected from the group consisting of PbO, $Pb_2O_3$ and $Pb_3O_4$, cathodically reducing said oxides to Pb in situ and thereafter anodically converting said Pb to $PbO_2$ in situ.

5. The process of claim 4 characterized in that the copper grid is lead coated prior to the application of the tin-nickel alloy plate.

6. The process of claim 4 characterized in that the grid is made from copper screen.

7. A process for producing a positive electrode for lead-sulfuric acid storage batteries, which comprises plating a tin-nickel alloy on a foraminous nickel plated stainless steel grid, plating a layer of lead on said tin-nickel alloy plate, filling the open spaces of and coating the plated grid with oxides of lead selected from the group consisting of PbO, $Pb_2O_3$ and $Pb_3O_4$, cathodically reducing said oxides to Pb in situ and thereafter anodically converting said Pb to $PbO_2$ in situ.

* * * * *